United States Patent [19]

Slegel et al.

[11] Patent Number: 5,282,210

[45] Date of Patent: Jan. 25, 1994

[54] TIME-DIVISION-MULTIPLEXED DATA TRANSMISSION SYSTEM

[75] Inventors: Timothy J. Slegel, Staatsburg; Charlotte A. Reed, Saugerties; Kirk D. Lamb, Kingston, all of N.Y.; Donald H. Friedberg, McKinney, Tex.

[73] Assignee: International Business Machines Corporation, Armonk, N.Y.

[21] Appl. No.: 891,521

[22] Filed: Jun. 1, 1992

[51] Int. Cl.⁵ .................... H03K 19/08; H04L 25/14
[52] U.S. Cl. .................... 370/112; 307/243; 328/104; 328/154
[58] Field of Search ............. 370/112; 307/243, 244, 307/242; 328/104, 105, 103, 152, 153, 154

[56] References Cited

U.S. PATENT DOCUMENTS

| | | | |
|---|---|---|---|
| 3,665,405 | 5/1972 | Sanders et al. | 340/172.5 |
| 3,995,120 | 11/1976 | Pachynski, Jr. | 179/15 AF |
| 4,010,385 | 3/1977 | Krol | 307/243 |
| 4,486,880 | 12/1984 | Jeffery et al. | 370/112 |
| 4,593,390 | 6/1986 | Hildebrand et al. | 370/112 |
| 4,789,984 | 12/1988 | Swartz | 370/112 |
| 4,791,628 | 12/1988 | Swartz | 370/112 |
| 4,926,423 | 5/1990 | Zukowski | 370/112 |
| 4,965,797 | 10/1990 | Yamane et al. | 370/112 |
| 5,111,455 | 5/1992 | Negus | 370/112 |

Primary Examiner—Wellington Chin
Attorney, Agent, or Firm—Lynn L. Augspurger

[57] ABSTRACT

A time-division multiplex system is disclosed where the data from two sources is coupled over a multiplexer controller by a generator comprising an XOR gate and a pair of latches where the output of both latches are coupled to the XOR gate and an inverter at the input of each latch. One of the latches is gated by a master clock signal and the other latch is gated by a clocked signal skewed approximately one-half clock cycle.

5 Claims, 4 Drawing Sheets

```
TO CYCLE = 0 1 2 3 4 5 6 7 8 9
TX CYCLE =  X X X X X X X X X X
           --------------------------
LATCH 11   1 1 3 3 5 5 7 7 9 9 B B D D F F H H J J
LATCH 13   2 2 4 4 6 6 8 8 A A C C E E G G I I K K

LATCH 31   . . 1 1 3 3 5 5 7 7 9 9 B B D D F F H H
LATCH 35   . . 2 2 4 4 6 6 8 8 A A C C E E G G I I

HOLD 33    . 1 1 3 3 5 5 7 7 9 9 B B D D F F G G H

XOR        1 0 1 0 1 0 1 0 1 0 1 0 1 0 1 0 1 0 1 0

LATCH 21   0 0 1 1 0 0 1 1 0 0 1 1 0 0 1 1 0 0 1 1

LATCH 23   1 0 0 1 1 0 0 1 1 0 0 1 1 0 0 1 1 0 0 1
```

FIG.2

```
TO CYCLE = 1 2 3 4 5 6 7 8 9 A
TX CYCLE =  X X X X X X X X X X
           --------------------------
LATCH 11   1 1 3 3 5 5 7 7 9 9 B B D DF F H H J J
LATCH 13   2 2 4 4 6 6 8 8 A A C C E E G G I I K K
LATCH 37   . . 1 1 3 3 5 5 7 7 9 9 B B D D F F H H
LATCH 39   . . . 2 2 4 4 6 6 8 8 A A C C E E G G I
LATCH 31   . . . . 1 1 3 3 5 5 7 7 9 9 B B D D F F
LATCH 35   . . . . 2 2 4 4 6 6 8 8 A A C C E E G G

XOR        1 0 1 0 1 0 1 0 1 0 1 0 1 0 1 0 1 0 1 0

LATCH 21   0 0 1 1 0 0 1 1 0 0 1 1 0 0 1 1 0 0 1 1

LATCH 23   1 0 0 1 1 0 0 1 1 0 0 1 1 0 0 1 1 0 0 1
```

FIG.4

TIME-DIVISION-MULTIPLEXED DATA TRANSMISSION SYSTEM

STATEMENT OF INVENTION

This invention relates to a time-division-multiplexed data transmission system which uses time-division-multiplexing and standard demultiplexing techniques which eliminate the need for latches capable of operating at the data rate of the output signal and does not require the generation and distribution of clock signals at a higher frequency than the incoming data.

BACKGROUND OF THE INVENTION

In computer systems, logic chips and modules (modules may be thermal conduction modules (TCMs) or normal cards) are connected together through wires that rum through a board. In many cases the number of conductors which connect these chips through the module or module to the board are a limiting factor in the design of the computer system. This application presents a method for reducing the number of these connections by approximately half with minimal impact on the design of the system. The method involves sending two signals on each wire connection in a time multiplexed fashion. Previous schemes have been proposed using this technique but have required double frequency clocking schemes or registers, which are very difficult to implement. The system being disclosed herein only requires a skewed clock rather than double-frequency clocks to registers. U.S. Pat. No. 4,926,432 of Zukowski entitled "Time-Division-Multiplexed Data Transmission System" illustrates a time-division-multiplex data transmission system that employs a skewing network to selectively skew each of a plurality of input signals by successively increasing integral multiples of the average period of the multiplex output signal. The skewed signals are merged in a combinatorial merging network having substantially identical delay times and data path to provide a multiplexed signal. In an embodiment shown, the invention provides a time-division-multiplexer in which the incoming signals are precoded prior to being skewed by a skewing network, so that the form of the multiplex output signal is a conventional sequentially interleaved input signal as provided by the prior art multiplexers, and the merging network is a binary tree EXCLUSIVE OR (XOR) gate array. Another multiplexing circuitry is shown in Krol in U.S. Pat. No. 4,010,385 entitled "Multiplexing Circuitry for Time Sharing a Common Conductor". This circuit includes a plurality of passive networks having multiphase clocking signals associated therewith to selectively enable transmission of information signals over a common conductor. No demultiplexing is shown.

U.S. Pat. No. 3,995,120 of Pachynski, Jr., entitled "Digital Time-Division Multiplexing System" describes a multiplexing scheme wherein N parallel digital signals having an average bit rate of frequency F1 are interleaved by a multiplexer to form a single composite line of bit rate F2. Prior to multiplexing signal gaps having a predetermined duration and having a fixed repetition rate are inserted into each of the N parallel signals. Adding gaps to each digital signal permits the bit rate between gaps to be F2/N.

U.S. Pat. No. 4,593,390 of Hildebrand et al. entitled "Pipeline Multiplexer" illustrates a method of multiplexing a selected one of m initial input signals that comprises N stages of select elements.

BRIEF DESCRIPTION OF THE DRAWINGS

FIG. 2 is a timing diagram of the operation of FIG. 1.

FIG. 4 is a timing diagram for FIG. 3.

SUMMARY OF THE INVENTION

In accordance with one embodiment of the present invention, data signals from a first and second source are clocked at a first data rate to a multiplexer for switching the data alternately between the two sources. The selector control signal generated is a double frequency of the clocking rate of said data signals. The selector control signal is generated with an XOR gate and a first latch with inverter input and a second latch with inverter input where the output of the latches are coupled to the XOR gate and fed back to the inverter input. A clocking signal at said first clocking rate is applied to said first latch and a skewed clock signal that is delayed one-half a clock cycle is applied to the second latch.

DESCRIPTION OF THE PREFERRED EMBODIMENT

There are two different schemes disclosed that may be used depending upon the amount of delay between a sending and receiving chip. One scheme typically just transfers two pieces of data in one cycle. The second scheme actually stores data on the wire so that two distinct pieces of data are being transferred on the connecting wire at any given time.

Figure 1:
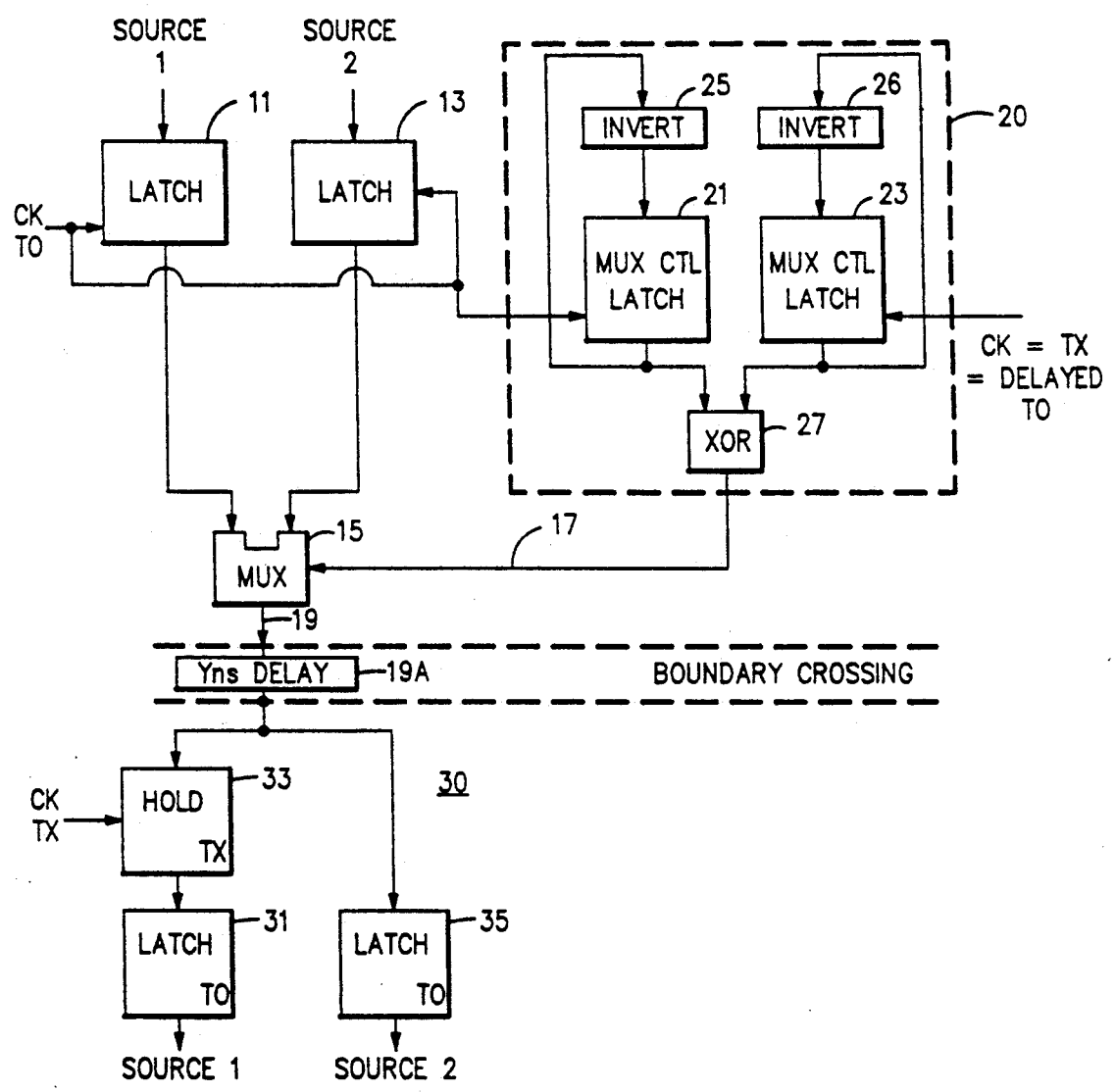
FIG. 1 is a logic diagram of one embodiment of the present invention where the delay time of the crossing from one device to the other is in the range $c/2 \geq z > 0$.

FIG. 1 illustrates the configuration where the minimum delay time of the crossing from one device to the other device minus the integral number of machine cycles is between zero and one-half the machine cycle time $(0 < z \leq c/2)$ where $z = y - n^*c$.

Assume the following definitions:
c = the cycle time of processor
y = the minimum time delay of chip crossing
n = a non-negative integer
$z = y - n^*c$ (note that z is greater than or equal to 0)

As mentioned above, the FIG. 1 is used whenever $0 < z \leq c/2$.

Most of the registers shown in the figures are normal TO registers, namely they are clocked nominally at no offset from the master system oscillator. The exception is the registers labelled TX in the figures. These have a positive offset of time x from the master system oscillator. In other words, they are "late clocks". Note that when we refer to registers they could be a simple register or a latch/trigger pair as in an LSSD designed system. In an LSSD system, both the latch and the trigger will be clocked with an offset clock. Normally x would be approximately equal to c/2 but this could vary if necessary. For the scheme in FIG. 1, the absolute requirement is (c-maxclockskew)>x>z where maxclockskew is the skew between clocks on the sending and receiving chips.

FIG. 2 illustrates the timing diagram for the configuration in FIG. 1.

Referring again to FIG. 1, the Source 1 and Source 2 data are latched in latches 11 and 13 respectively. The latches 11 and 13 are clocked at master system oscillator rate and phase of TO. The latched outputs are applied to multiplexer 15. The multiplexer 15 is responsive to a selector control signal on lead 17 for alternately connecting the output from latch 11 or output from latch 13 to output conductor 19. The selector control signal for the multiplexer 15 is provided by the double frequency control generator 20. This double frequency control generator comprises a latch 21 clocked at the master clock $T_O$ and a latch 23 clocked at clock $T_x$ where $T_x$ is positive offset time x from the nominal oscillator frequency where $T_x$ is normally delayed a half $T_O$ cycle. The output from latch 21 is coupled to inverter 25 which inverts the output to the latch 21 such that the latch alternately triggers to provide a logic "zero" and then a logic "one" every cycle. Similarly, the skewed output from the latch 23 is applied to the inverter 26 which inverts the output to produce alternately a "one" and a "zero" out of latch 23 which is clocked out in response to the clock $T_x$ which is skewed or delayed one-half cycle. The output from latches 21 and 23 are EXCLUSIVELY ORed at gate 27 to provide the EXCLUSIVE OR (XOR) output as the selector control signal on lead 17 to multiplexer 15 such that multiplexer 15 switches state every half clock cycle to provide the data from latches 11 or 13 alternately through the multiplexer through the conductor 19 and delay 19a (delay depending on the length of the conductor) to the receiver demultiplexer circuit 30. The input to latch 31 passes through a hold latch circuit 33 which is a hold or delay circuit. Latch 33 is clocked at the skewed or delayed clock signal $T_x$ and the output to the latch 35 is not delayed thereby providing the outputs from latch 11 to latch 31 and from latch 13 to latch 35. By making the latches 23 and 33 in sync, the signal from source 1 is clocked into latch 31 when the multiplexer couples the source 2 signal into latch 35.

Referring to FIG. 2, there is illustrated a timing diagram of FIG. 1 operation. In the diagram time progresses toward the right. The latches and the signals are shown in the vertical rows. Pieces of data are numbered starting from 1-9 and continuing from "A" through "M". Note that every other column contains a Tx clock period. The upper row shows the data associated with the latch on the left (11 or 31) in FIG. 1, while the lower row shows the data associated with the latch on the right (13 or 35). The multiplex control signal out of XOR is changed every half cycle. Latches 21 and 23 change every cycle or every other half cycle with the output from latch 23 delayed a half cycle.

Figure 3:
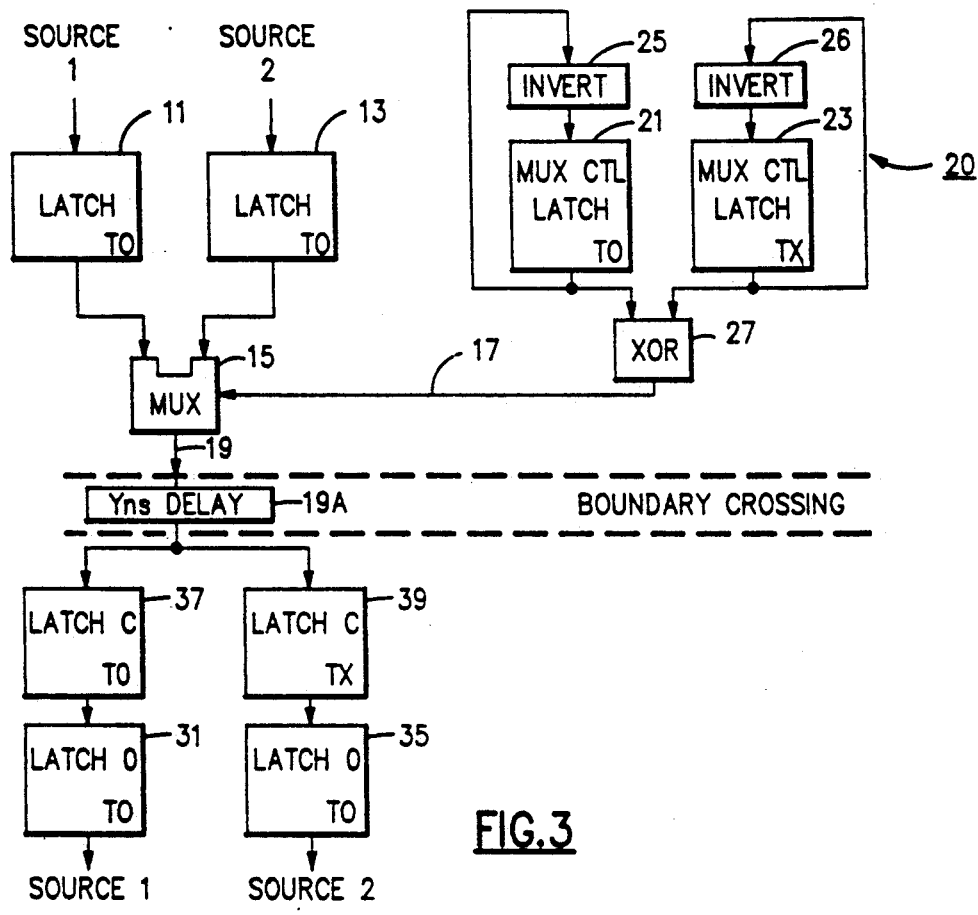
FIG. 3 is a logic diagram of another embodiment of the present invention where $c2 < z \leq c$.

Referring to FIG. 3, there is illustrated the operation and system when the requirement is c/2<z≤c. The sending portion remains the same with latches 11 and 13 being clocked to the $T_0$ clock and the multiplexer 15 being controlled in the same manner by the same control signals generated in the same manner on control lead 17. However, at the receiver end there is a latch for both. There is a requirement for a latch for both the input to latch 31 and input to latch 35 where the input to latch 31 has a latch 37 clocked at $T_0$ and the input to latch 35 passes through latch 39 clocked at the skewed clock $T_x$. The timing diagram for this is shown in FIG. 4.

Referring to FIG. 4, the pieces of data are again numbered from 1 through 9 and continue with "A" through "J". Time progress to the right. Every other column contains a $T_x$ clock period. The multiplex control signal out of XOR gate 27 changes every half cycle to alternately apply source 1 and source 2 on conductor 19. Latch 37 is clocked a half-cycle before latch 39 to couple the source to latch 31 and the source 2 to latch 35. Both latches 31 and 35 are clocked at TO.

In both schemes, the number of I/O (input/output) connections is reduced from two to one. If this were a multibit databus, the number of I/O connections will be one-half the original plus whatever I/O are required to implement the Tx clocks (typically two). The only disadvantage is that essentially no logic may be done in the cycle where the boundary crossing is located since there are critical timing requirements already imposed by using this method. However, in many areas of design, this is not a significant disadvantage since little logic would be done in this cycle anyway.

Figures 5, 6, 8:
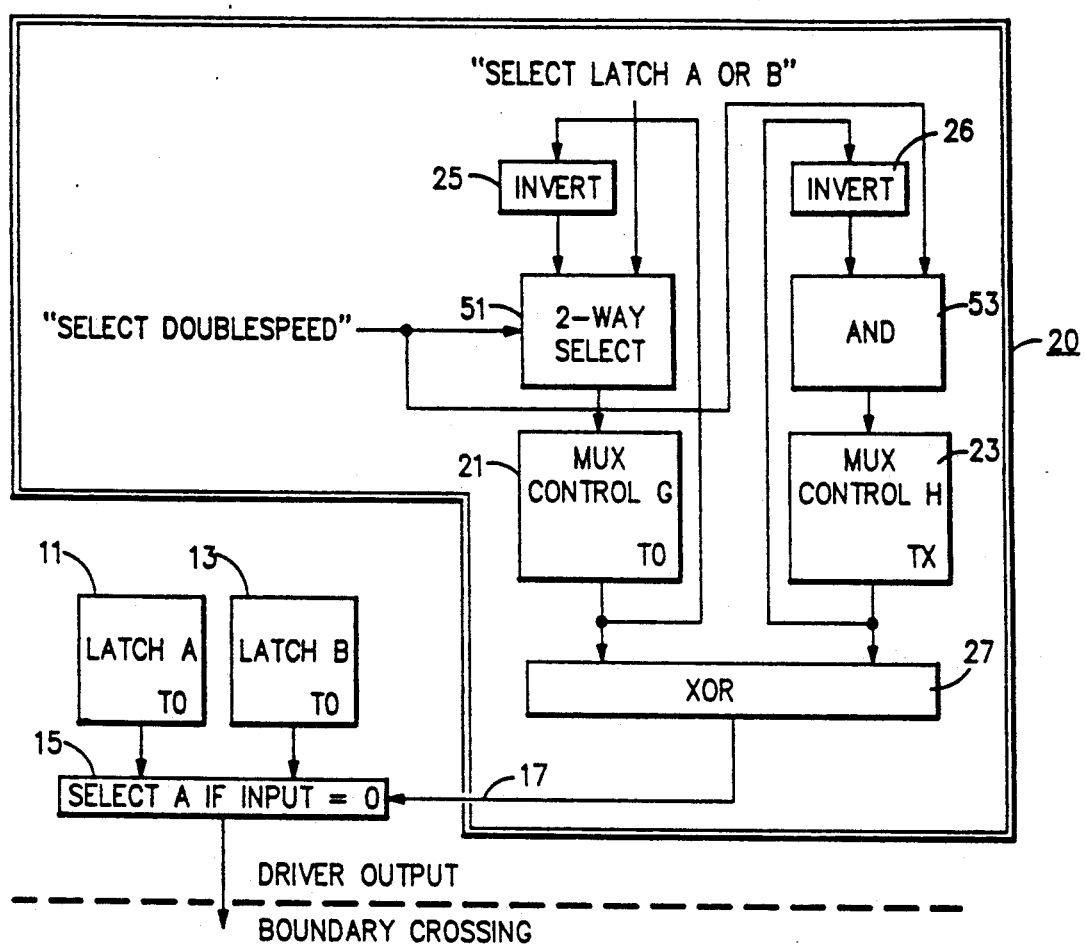
FIG. 5 is an alternative embodiment where the transmission rate of the driver can be changed.
FIG. 6 is a timing diagram of the driver in FIG. 5 in a single speed selectable mode.
FIG. 8 is a timing diagram of the driver output of FIG. 7.

In accordance with another preferred embodiment of the present invention shown in FIG. 5, the speed of the multiplexer driver or control in FIG. 1 or FIG. 2 can be changed from regular speed of the clock to double speed. This can be useful for example where the machine transmitting can implement the double speed of FIGS. 1 and 3 but the receiver is not prepared to receive it. In accordance with this dual speed configuration of FIG. 5, the transmitting machine can be made to select single-speed busing. When the receiving hardware is able to implement the double speed driver, the changing of the polarity to the dual speed input provides the upgrade. The multiplexer control signal generator has a two-way select 51 between inverter 25 and latch 21 and an enable AND gate 53 between the inverter 26 and latch 23. The "select double speed" input polarity (logic 1 for example) to select 51 forces the XOR 27 to invert in the same manner as in FIGS. 1 and 2. The logic "1" also enables AND gate 53 to provide the delayed control signal. When a logic zero at double speed inputs to select 51 and AND gate 53, only the contents of "MUX control G" (latch 21) pass to XOR gate 27. This system provides the ability to set the XOR output to gate latch A (latch 11) or latch B (latch 13). The two-way select 51 in response to the zero polarity at "SELECT DOUBLE SPEED" allows "SELECT LATCH A or B" to be latched in "MUX control G" which on the following cycle, will pass through XOR 27 and select A (11) or B (13) to be the driver output. The double-speed portion is disabled. If "SELECT LATCH A or B" input at switch 51 is logic 0 and 0 is out of XOR gate 27, the source at latch 11 or latch A is applied out of multiplexer 15. If "SELECT LATCH A or B" input at switch 51 is logic 1 on the following cycle, this logic 1 passes XOR gate 27 to gate the source at latch 13 or latch B. FIG. 6 shows the driver output of the circuit of FIG. 3 in the single speed mode. Double-speed mode is enabled by the logic 1 to two-way select 51 and AND gate 53, and the operation is as described in FIGS. 1–4.

Figure 7:
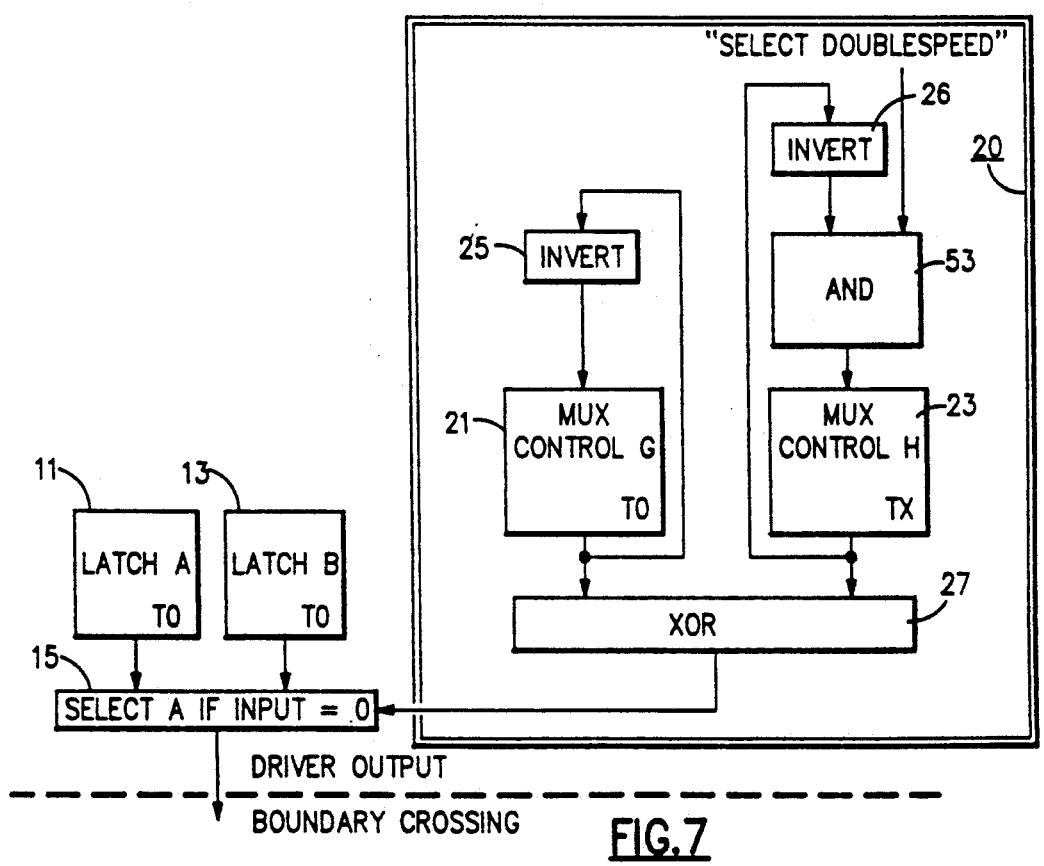
FIG. 7 is another simpler embodiment where the transmission rate of the driver can be changed.

A simpler circuit in which the XOR output inverts every cycle or twice per cycle, is shown in FIG. 7. This circuit can be used if the ability to set the XOR output to the arbitrary value in single speed mode is not needed. This eliminates the need for the input "SE- LECT LATCH A or B" in FIG. 5. FIG. 8 shows the driver output when the circuit of FIG. 7 is used in single-speed mode. In single-speed mode, MUX Control Latch G can have either a 0 or 1 scanned into it so that it places the contents of either latch A or B, respectively, on the bus in cycle 0. FIG. 6 shows the single-speed output in cycle 0 when MUX control G has a 1 scanned into it. FIG. 8 shows the driver output of both the circuits of FIGS. 5 and 7 in double-speed mode. The input "SELECT DOUBLESPEED" is asserted. This forces the XOR output to invert twice per cycle and the driver output matches that in FIGS. 1, 2 and 3.

While the invention has been particularly shown and described with reference to preferred embodiments thereof, it will be understood by those skilled in the art that various changes in form and details may be made therein without departing from the spirit and scope of the invention.

We claim:

1. A multiplexer system comprising:
a first latch for a first source of data signals;
a second latch for a second source of data signals;
means including a clocking signal having a clocking cycle establishing a cycle time for providing a first clocking signal at a given phase and frequency to said first and second latches to provide clocked outputs;
a multiplexer for alternately coupling the clocked outputs from said first and second latches at first and second terminals respectively in response to a select control signal; and
means for providing said select control signal at twice the clocking rate, said means for providing said select control signals including a first inverter coupled to a third latch with the output of the third latch coupled back to the input of said first inverter, a second inverter coupled to a fourth latch with the output of the fourth latch coupled back to the input of the second inverter, and an XOR gate responsive to the outputs from said third and fourth latches to provide said select control signal, said third latch output clocked out by said first clocking signals and said fourth latch clocked out by said clocking signal delayed approximately one-half of said clocking cycle time of the clocking cycle.

2. The combination claimed in claim 1 including a single coupling means coupled to said multiplexer for sending said multiplexed data signals to a receiving means, where delays over said coupling means is less than one-half the cycle time and said receiving means includes fifth and sixth latches connected in series to said coupling means, with said fifth latch coupled to said coupling means clocking data from said first source to said sixth latch using said delayed clocking signal and a seventh latch coupled to said coupling means clocked out by said first clocking signal, whereby a signal from a first data source is clocked into said sixth latch when said multiplexer couples a second data source into said seventh latch.

3. The combination claimed in claim 1 including a single coupling means coupled to said multiplexer for sending said multiplexed data signals to a receiving means where delays over said coupling means is greater than a half of the clocking signal cycle time and wherein said receiving means includes fifth and sixth latches connected in series to said coupling means, with said fifth latch coupled to said coupling means clocking data from said first source to said sixth latch by said first clocking signal and said receiving means including seventh and eight latches connected in series to said coupling means, and wherein said seventh data latch is clocked at said delayed clocking signal to couple second source data signals to said eight latch at a skewed clock cycle time.

4. The combination of claim 1 wherein said means for providing said select control signals is selectable between the clocking rate and twice the clocking rate by providing gate means between said second inverter and said fourth latch for providing, only when enabled, said delayed clocking signal.

5. The combination of claim 1 further including two-way select means between said first inverter and said third latch for in a first state coupling said inverter output to said third latch and in a second state providing a source select signal to said multiplexer and providing a feedback signal from said multiplexer to said first inverter.

* * * * *